United States Patent [19]

Ozawa et al.

[11] Patent Number: 5,393,844
[45] Date of Patent: Feb. 28, 1995

[54] CHLORINATED POLYETHYLENE RUBBER COMPOSITION CONTAINING A 2,4,6-TRIMERCAPTO-1,3,5-TRIAZINE DICYCLOHEXYLAMINE SALT

[75] Inventors: Osamu Ozawa, Hiratsuka; Tetsu Kitami, Hadano, both of Japan

[73] Assignee: The Yokohama Rubber Co., Ltd., Tokyo, Japan

[21] Appl. No.: 78,860

[22] Filed: Jun. 21, 1993

Related U.S. Application Data

[63] Continuation of Ser. No. 697,575, May 9, 1991, abandoned.

[30] Foreign Application Priority Data

May 10, 1990 [JP] Japan .................................. 2-120709

[51] Int. Cl.⁶ .............................................. C08F 8/34
[52] U.S. Cl. .................. 525/333.9; 428/461; 524/348; 525/285
[58] Field of Search ........................ 525/334.1, 333.9

[56] References Cited

U.S. PATENT DOCUMENTS 4,165,416  8/1979  Matoba .............................. 525/346

FOREIGN PATENT DOCUMENTS 61-26820  6/1986  Japan .

*Primary Examiner*—Christopher Henderson
*Attorney, Agent, or Firm*—Finnegan, Henderson, Farabow, Garrett & Dunner

[57] ABSTRACT

Rubber compositions having high tensile modulus at 100% and strong metal adhesion. The rubber compositions include chlorinated polyethylene rubber and/or its derivative reformed with maleic anhydride with from 0.2 to 10 parts by weight per 100 parts of the rubber of a 2,4,6-trimercapto-1,3,5-triazine dicyclohexylamine salt.

1 Claim, 1 Drawing Sheet

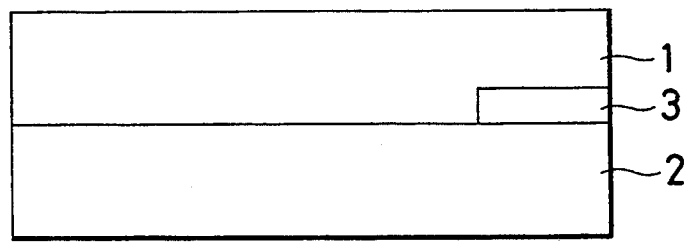

# CHLORINATED POLYETHYLENE RUBBER COMPOSITION CONTAINING A 2,4,6-TRIMERCAPTO-1,3,5-TRIAZINE DICYCLOHEXYLAMINE SALT

This application is a continuation of application Ser. No. 06/697,575, filed May 9, 1991, now abandoned.

BACKGROUND OF THE INVENTION

1. Field of the Invention

This invention relates to rubber compositions containing chlorinated polyethylene type rubbers and providing increased tensile modulus and improved metal adhesion. Such compositions are suitable for use in rubber-metal composite structures.

2. Description of the Prior Art

There is a growing tendency to use a variety of rubber products such as tires, belts, shapes, rolls, hoses and the like under adversely oily conditions at high temperatures and pressures and for long periods of time. In that instance, the fastly deteriorating rubbers require laborious maintenance and frequent replacement and sometimes pose serious problems or hazards.

Certain rubbers are known to be highly resistant to oil and heat for example at from 120° to 150° C. They include acrylonitrile-butadiene rubber (NBR), acrylic rubber (ACM), ethylene-acrylate rubber (AEM), ethylene-acrylate-vinyl acetate rubber (ER), chlorosulfonated polyethylene rubber (CSM), chlorinated polyethylene rubber (CM) and reformed rubbers such as NBR and similar rubbers having their conjugated dienes hydrogenated. Chlorinated polyethylene rubber (CM) amongst these rubbers provides a good balance between and among oxidation resistance, weather resistance, oil resistance and chemical resistance.

Chlorinated polyethylene rubber is by nature unvulcanizable with sulfur due to the absence of double bonds in the molecule. Vulcanization is effected for that reason with use of organic peroxides, thioureas, diamines and trithiocyanuric acids.

Thioureas and diamines, however, will make the resulting vulcanizates susceptible to insufficient modulus. Organic peroxides and trithiocyanuric acids, though giving improved modulus, will lead to reduced bonding to metals such as brass and the like. This causes a problem with the use of chlorinated polyethylene rubber.

In an attempt to fully utilize the physical characteristics associated with chlorinated polyethylene rubber, it has been proposed to blend a vulcanizing system composed of magnesia, epoxy resin, trially isocyanurate, dially phthalate, trithiocyanuric acid and organic peroxide as disclosed for instance in Japanese Patent Publication No. 61-26820. This prior system of vulcanization, however, requires so many components that it entails limited choices of formulations, and has thus failed to further improve the ultimate rubber composition in regard to its physical properties.

SUMMARY OF THE INVENTION

With the foregoing drawbacks of the prior art in view, the present invention seeks to provide a new rubber composition which excels in tensile modulus, metal adhesiveness and formulation selectivity.

The composition according to the invention finds application to tires, belts, shapes, rolls, hoses and various other rubber products. It may be used particularly as interlaminar bonds for hoses of a heat-resistant, high-pressure type constructed with an inner tube, an outer cover and a pressure-resistant, steel-corded reinforcement layer interposed therebetween.

More specifically, the invention provides a rubber composition comprising a base rubber consisting of a chlorinated polyethylene rubber or a maleic anhydride-reformed chlorinated polyethylene rubber or a combination thereof and a 2,4,6-trimercapto-1,3,5-triazine dicyclohexylamine salt in an amount of 0.2 to 10 weight parts per 100 weight parts of the base rubber.

BRIEF DESCRIPTION OF THE DRAWING

The accompanying drawing is a diagramatical cross-sectional view of a rubber-brass laminate assembled with the rubber composition of the present invention, shown used for adhesion testing.

DETAILED DESCRIPTION OF THE INVENTION

According to a first preferred embodiment of the invention, there is provided a rubber composition formulated essentially with either one or both of a chlorinated polyethylene rubber (A) and a maleic anhydride-reformed chlorinated polyethylene rubber (B) and a 2,4,6-trimercapto-1,3,5-triazine dicylohexylamine salt (C).

A second embodiment of the invention is directed to a rubber composition made up of either one or both of components (A) and (B), component (C) and a 2-mercaptobenzothiazole dicyclohexylamine salt (D).

A third embodiment of the invention contemplates the provision of a rubber composition comprising either one or both of components (A) and (B), component (C) and at least one of a sulfur (E) and an organic sulfur-containing compound (F) which compound (F) is not component (C) and (D).

A fourth embodiment of the invention provides a rubber composition comprised of either one or both of components (A) and (B), component (C), component (D) and at least one of components (E) and (F).

There are known a number of chlorinated polyethylene rubbers of varied molecular weights and chlorine contents and distributions and other physical properties. All such grades of rubbers are eligible as components (A) for purposes of the invention.

Component (B) is a reformed chlorinated polyethylene rubber resulting from reacting a given grade of component (A) with maleic anhydride during kneading. Component (B) contributes, owing to the presence in the molecule of a dicarboxylic acid group or its anhydride group or both, to increased the efficiency of vulcanization and hence widened selectivity of formulation. The reformed type of rubber as component (B) is commercially available for instance as Elaslen Super from Showa Denko Co.

Components (A) and (B) may be used alone or in combination.

Four different systems of vulcanization are possible in the present invention with the vulcanizing agents specified below.

(1) 2,4,6-trimercapto-1,3,5-triazine dicyclohexylamine salt alone or component (C)
(2) component (C) combined with 2-mercaptobenzothiazole dicyclohexylamine salt or component (D)
(3) component (C) combined with sulfur or component (E) and/or an organic sulfur-containing compound or component (F) which component (F) is other than component (C) or (D)

(4) component (C) combined with component (D) and also with component (E) and/or component (F)

Component (C) is a 2,4,6-trimercapto-1,3,5-triazine dicyclohexylamine salt with a molecular weight of about 358. It is commonly termed TDCA and is represented by the formula (I)

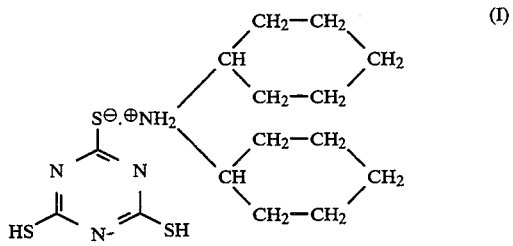

Compound (D) is a 2-mercaptobenzothiazole dicyclohexylamine salt with a molecular weight of about 303. It is called MDCA and is represented by the formula (II)

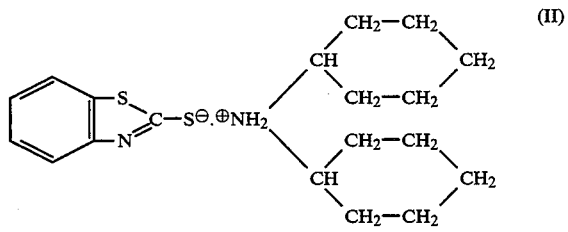

Component (E) is chosen from sulfurs of particulate, highly dispersible and insoluble types that are well known and are in common use.

Component (F) is an organic sulfur-containing compound other than component (C) or (D). Typical examples include thiurams such as tetramethylthiuram disulfide, tetraethylthiuram disulfide, tetrabutylthiuram disulfide, tetramethylthiuram monosulfide, dipentamethylenethiuram tetrasulfide and the like, dithiocarbamic acid salts such as piperidine pentamethylenedithio carbamate, pipecoline pipecolyldithio carbamate, zinc dimethyldithio carbamate, zinc diethyldithio carbamate, zinc dibutyldithio carbamate, zinc N-ethyl-N-phenyldithio carbamate, zinc N-pentamethylenedithio carbamate, zinc dibenzyldithio carbamate, sodium dimethyldithio carbamate, sodium diethyldithio carbamate, sodium dibutyldithio carbamate, copper dimethyldithio carbamate, ferric dimethyldithio carbamate, tellurium diethyldithio carbamate and the like, xanthantogenic acid salts such as zinc butyl xanthantogenate, zinc isopropyl xanthantogenate, sodium isopropyl xanthantogenate and the like, sulfenamides such as N-cyclohexyl-2-benzothiazole sulfenamide, N-t-butyl-2-benzothiazole sulfenamide, N-oxydiethylene-2-benzothiazole sulfenamide, N,N-diisopropyl-2-benzothiazole sulfenamide and the like and thiazoles such as 2-mercaptobenzothiazole, dibenzothiazyl disulfide and the like. Either two or more of these compounds may be used where desired.

The rubber compositions according to the invention essentially comprise component (C) or TDCA as a vulcanizing agent. This component has an important role to improve modulus at 100% and adhesion to metals such as brass. The second to fourth embodiments of the invention further incorporate component (D) or MDCA, component (E) or sulfur and component (F) or an organic sulfur-containing compound which serves to synergistically coact with TDCA, leading to further improvements in tensile modulus and metal bonding. Blending of either one or more of components (D) to (F), allows TDCA to be used in smaller proportions and hence with wider choices of formulations.

Component (C), TDCA, may range in an amount of from 0.2 to 10 weight parts, preferably 0.5 to 5 weight parts, per 100 weight parts of the base rubber or component (A) and/or component (B) in each of the embodiments of the invention. Less than 0.2 parts would not be effective for vulcanization, whereas more than 10 parts would make the resulting vulcanizate insufficiently resistant to heat.

Component (D), MDCA, may be added in an amount up to 5 weight parts in the second embodiment and in an amount up to 10 weight parts in the fourth embodiment. Each such amount is based on 100 weight parts of the base rubber and should be construed to be greater than zero. Above 5 parts and 10 parts in the two embodiments, respectively, would cause insufficient metal bonding.

The amount of component (E) or sulfur, or component (F) or organic sulfur-containing compound, may be set to be less than 5 weight parts but more than 0 weight part per 100 weight parts of the base rubber in the third and fourth embodiments. Component (E) or (F) if in larger amounts than 5 parts would render the resultant vulcanizate less resistant to heat.

The rubber composition according to the invention may be further blended, when desired, with various other additives. They include acid acceptors such as magnesia and the like, fillers, reinforcing agents, plasticizers, antioxidants, processing aids and the like.

Vulcanization may be effected in a conventional manner at a temperature of 130° to 200° C. and by press curing, steam curing, hot water curing or the like.

The composition of the invention finds application to those rubber products calling for increased oil resistance at elevated temperature and pressure. For its superior bonding to brass, such composition is suitable particularly for use with brass structures. These structures are usually employed to reinforce rubber products and formed of filaments, tubings, plates, steel stocks and the like which may be plated with brass.

The invention will now be described by way of the following examples which are provided for illustrative purposes only. All formulations are indicated by weight part.

Performance evaluation was made under the conditions given below.

Tensile Modulus (100% Modulus)

Different rubber compositions were prepared as shown in Tables 1 to 3, followed by admixture on a mixing roll at 60° C. for 15 minutes and by subsequent sheeting to a thickness of 2.0 mm on a laboratory roll. The resulting rubber sheet was press-cured on a laboratory press at a temperature of 165° C. and at a face pressure of 30 kgf/cm² and for a length of time of 30 minutes.

Modulus at 100% was determined at a tensile speed of 500 mm/min. All the procedures and calculations were as stipulated by JIS K6301.

Moduli of greater than 50 kgf/cm$^2$ are acceptable and those of more than 70 kgf/cm$^2$ for particular application.

Adhesion to Brass

The rubber sheet obtained above and designated at 1 in the accompanying drawing was contact-bonded over a brass plate 2 with a cellophane strip 3 interposed therebetween. The strip 3 was used to hold the sheet 1 in partly unbonded relation to the plate 2 and to provide a place to grip the sheet in peel testing.

The resultant laminate was press-cured into an integral structure by means of a laboratory press at 165° C. and at 30 kgf/cm$^2$ for 30 minutes. After being allowed to stand for 24 hours at room temperature, the vulcanizate was cut to a width of 2.54 cm to give a test specimen.

JIS K6301 was followed in measuring peel strength. The rubber sheet was caused to forcibly peel off at an angle of 90° with the plane of the brass plate and at a speed of 50 mm/min.

Peel strengths of above 7 kgf/25 mm and above 10 kgf/25 mm in some cases are adjudged to be acceptable.

In these examples the abbreviation "IE" is taken to denote the inventive example and "CE" the comparative example.

Inventive Examples 1 to 3/Comparative Examples 1 and 2

The effects of TDCA were examined with the rubber compositions of Table 1 in which the results obtained are also listed.

The use of TDCA, IEs 1 to 3, is highly satisfactory in respect of both tensile modulus and brass bonding. Prior vulcanizing agents failed to simultaneously improve the two physical characteristics as appears clear from CEs 1 and 2.

Inventive Examples 4 to 9/Comparative Examples 3 to 5

The effects of TDCA contents in the rubber compositions were determined in these examples and the results are shown in Table 2.

TDCA contents of less than 0.2 weight part, CEs 3 and 4, were unacceptable in tensile modulus. More than 10 weight parts was less bondable to brass as is evident from CE 5.

Inventive Examples 10 to 14

The rubber compositions of Table 3 were tested to examine the effects of sulfur and organic sulfur-containing compounds.

The use of the two different components has been proved to be effective in providing a good balance between tensile modulus and brass bonding. IEs 10 to 14 are comparable in the beneficial effects to one another irrespective of the types of the components now under test.

Listed below are the details of the various components used in Tables 1 to 3.

1) Elaslen 301A, chlorinated polyethylene rubber, Showa Denko Co.
2) Elaslen Super G-107, maleic anhydride-reformed chlorinated polyethylene rubber, Showa Denko Co.
3) Zisnet-F, trithiocyanuric acid, Shankyo Chemicals Co.
4) SRF Asahi No. 50, SRF carbon black, Asahi Carbons Co.
5) Adekacizer C9-N, trimellitate ester, Adeka Argus Chemicals Co.
6) Sunceller TT-PO, tetramethylthiuram disulfide, Sanshin Chemicals Co.
7) Sunceller TS-G, tetramethylthiuram monosulfide, Sanshin Chemicals Co.

TABLE 1

| Formulation/Property | CE 1 | CE 2 | IE 1 | IE 2 | IE 3 |
|---|---|---|---|---|---|
| Elaslen Super G-107 2) | 100 | 100 | 100 | 100 | 100 |
| TDCA | | | 2.5 | 1.5 | 2.5 |
| MDCA | | 2.5 | | 0.2 | |
| Zisnet-F 3) | 2.5 | 1.5 | | | 0.3 |
| SFR Asahi No. 50 4) | 100 | 100 | 100 | 100 | 100 |
| MgO | 10 | 10 | 10 | 10 | 10 |
| stearic acid | 1 | 1 | 1 | 1 | 1 |
| Adekacizer C9-N 5) | 25 | 25 | 25 | 25 | 25 |
| tensile modulus, kgf/cm$^2$ | 32 | 126 | 118 | 110 | 102 |
| peel strength, kgf/25 mm | 14.0 | 1.0 | 10.0 | 10.0 | 15.0 |

TABLE 2

| Formulation/Property | CE 3 | CE 4 | IE 4 | IE 5 | IE 6 | IE 7 | IE 8 | IE 9 | CE 5 |
|---|---|---|---|---|---|---|---|---|---|
| Elaslen Super G-107 2) | 100 | 100 | 100 | 100 | 100 | 100 | 100 | 100 | 100 |
| TDCA | 0 | 0.1 | 0.2 | 0.5 | 1.5 | 2.5 | 5.0 | 10.0 | 15.0 |
| MDCA | 1.5 | 1.5 | 1.5 | 1.5 | 1.5 | 1.5 | 1.5 | 1.5 | 1.5 |
| Zisnet-F 3) | 0.3 | 0.3 | 0.3 | 0.3 | 0.3 | 0.3 | 0.3 | 0.3 | 0.3 |
| SFR Asahi No. 50 4) | 100 | 100 | 100 | 100 | 100 | 100 | 100 | 100 | 100 |
| MgO | 10 | 10 | 10 | 10 | 10 | 10 | 10 | 10 | 10 |
| stearic acid | 1 | 1 | 1 | 1 | 1 | 1 | 1 | 1 | 1 |
| Adekacizer C9-N 5) | 25 | 25 | 25 | 25 | 25 | 25 | 25 | 25 | 25 |
| tensile modulus, kgf/cm$^2$ | 23 | 42 | 68 | 82 | 118 | 130 | 148 | 158 | 162 |
| peel strength, kgf/25 mm | 16.5 | 16.0 | 15.6 | 14.5 | 13.5 | 9.0 | 8.2 | 7.4 | 6.5 |

TABLE 3

| Formulation/property | IE 10 | IE 11 | IE 12 | IE 6 | IE 13 | IE 14 |
|---|---|---|---|---|---|---|
| Elaslen 301A 1) | 100 | 100 | 100 | | | |
| Elaslen super G-107 2) | | | | 100 | 100 | 100 |
| TDCA | 1.5 | 1.5 | 1.5 | 1.5 | 1.5 | 1.5 |
| MDCA | 1.5 | 1.5 | 1.5 | 1.5 | 1.5 | 1.5 |
| sulfur | 0.3 | | | 0.3 | | |
| Sunceller TT-PO 6) | | 0.3 | | | 0.3 | |
| Sunceller TS-G 7) | | | 0.3 | | | 0.3 |
| SRF Asahi No. 50 4) | 100 | 100 | 100 | 100 | 100 | 100 |
| MgO | 10 | 10 | 10 | 10 | 10 | 10 |

TABLE 3-continued

| Formulation/property | IE 10 | IE 11 | IE 12 | IE 6 | IE 13 | IE 14 |
|---|---|---|---|---|---|---|
| stearic acid | 1 | 1 | 1 | 1 | 1 | 1 |
| Adekacizer C9-N 5) | 25 | 25 | 25 | 25 | 25 | 25 |
| tensile modulus, kgf/cm$^2$ | 125 | 121 | 120 | 118 | 117 | 121 |
| peel strength, kgf/25 mm | 20.0 | 17.0 | 7.0 | 13.5 | 11.0 | 7.0 |

What is claimed is:

1. A rubber composition comprising:
   (a) 100 parts by weight of a rubber selected from the group consisting of a chlorinated polyethylene rubber, a maleic anhydride reformed chlorinated polyethylene rubber or mixtures thereof; and
   (b) from 0.2 to 10 parts by weight of a 2,4,6-trimercapto-1,3,5-triazine dicyclohexylamine salt formed prior to its addition to said rubber.

* * * * *